United States Patent
Oerton et al.

(10) Patent No.: US 9,763,218 B2
(45) Date of Patent: *Sep. 12, 2017

(54) SYSTEM AND METHOD FOR DETERMINING A LOCATION FOR A DEVICE IN A COMMUNICATION NETWORK

(71) Applicant: BLACKBERRY LIMITED, Waterloo (CA)

(72) Inventors: Kevin J. Oerton, Waterloo (CA); Michael Peter Montemurro, Mississauga (CA)

(73) Assignee: BLACKBERRY LIMITED, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/205,581

(22) Filed: Jul. 8, 2016

(65) Prior Publication Data
US 2017/0013586 A1 Jan. 12, 2017

Related U.S. Application Data

(63) Continuation of application No. 13/193,979, filed on Jul. 29, 2011, now Pat. No. 9,420,396.

(51) Int. Cl.
| | |
|---|---|
| *H04W 64/00* | (2009.01) |
| *H04W 72/04* | (2009.01) |
| *H04W 4/00* | (2009.01) |
| *H04W 84/02* | (2009.01) |
| *H04W 24/02* | (2009.01) |

(Continued)

(52) U.S. Cl.
CPC ............ *H04W 64/00* (2013.01); *H04L 67/42* (2013.01); *H04W 4/00* (2013.01); *H04W 24/02* (2013.01); *H04W 84/02* (2013.01); *H04W 72/0406* (2013.01); *H04W 84/12* (2013.01); *H04W 88/08* (2013.01)

(58) Field of Classification Search
CPC ....... H04W 4/02–4/046; H04W 40/20; H04W 48/04; H04W 64/003; H04W 64/068; H04W 4/00; H04W 84/02; H04W 24/02; H04W 84/12; H04W 88/08; H04W 72/04–72/0433; H04W 72/0453; H04W 72/1215

See application file for complete search history.

(56) References Cited

U.S. PATENT DOCUMENTS

| | | | |
|---|---|---|---|
| 2011/0164581 A1* | 7/2011 | Keon | H04W 72/0453 370/329 |
| 2012/0188938 A1* | 7/2012 | Venkatraman | H04W 64/003 370/328 |

OTHER PUBLICATIONS

Oerton, Kevin, J., "System and Method for Determining a Location for a Device in a Communication Network," U.S. Appl. No. 13/193,979, filed Jul. 29, 2011.

* cited by examiner

*Primary Examiner* — Eric Myers
(74) *Attorney, Agent, or Firm* — Perry + Currier Inc.

(57) ABSTRACT

The disclosure recites a system and method of identifying location data for a server device managing communications for a wireless network. The method comprises: obtaining location data for the server device; identifying a location for the server device by analyzing at least the location data; updating data in the server device with the location; identifying a communication transmission range for the location for the server device; and configuring communications generated by the server device to conform to the communication transmission range.

13 Claims, 5 Drawing Sheets

(51) Int. Cl.
*H04W 84/12* (2009.01)
*H04W 88/08* (2009.01)
*H04L 29/06* (2006.01)

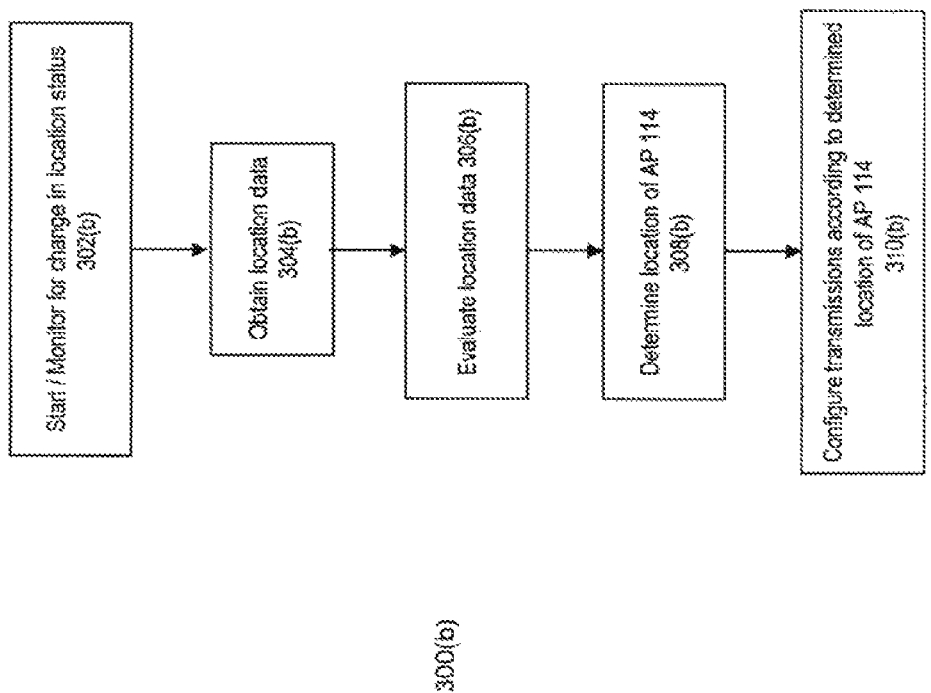

SYSTEM AND METHOD FOR DETERMINING A LOCATION FOR A DEVICE IN A COMMUNICATION NETWORK

FIELD OF DISCLOSURE

The disclosure provided herein describes generally a system and method of determining a location of a device in a communication network. In particular, location data is provided to an access point device in the network.

BACKGROUND OF DISCLOSURE

Wireless mobile communication devices perform a variety of functions to enable mobile users to stay organized and in contact with others in a communication network through e-mail, schedulers and address books. Wireless devices are designed to enter and leave different wireless networks.

Wireless networks utilize communication hubs to communicate with the wireless devices. Some hubs provide access points to their networks. Hubs may be wireless or wired. Management of access to the wireless network can be controlled through the hubs. When wireless hubs are used in a network, they move from location to location to connect to different interface points to the network. Wired hubs can also be moved to connect to different ports to the network. When a hub is moved or is initially activated, it may not know or be able to determine its geographic location.

BRIEF DESCRIPTION OF THE DRAWINGS

Embodiments of the invention will now be described, by way of example only, with reference to the accompanying drawings, in which:

FIG. 3B is a flowchart of exemplary processes executed by a second algorithm in the access point of FIG. 2 in identifying a change in network conditions and re-determining a location data for the access point according to an embodiment.

DESCRIPTION OF EMBODIMENTS

Figure 1:
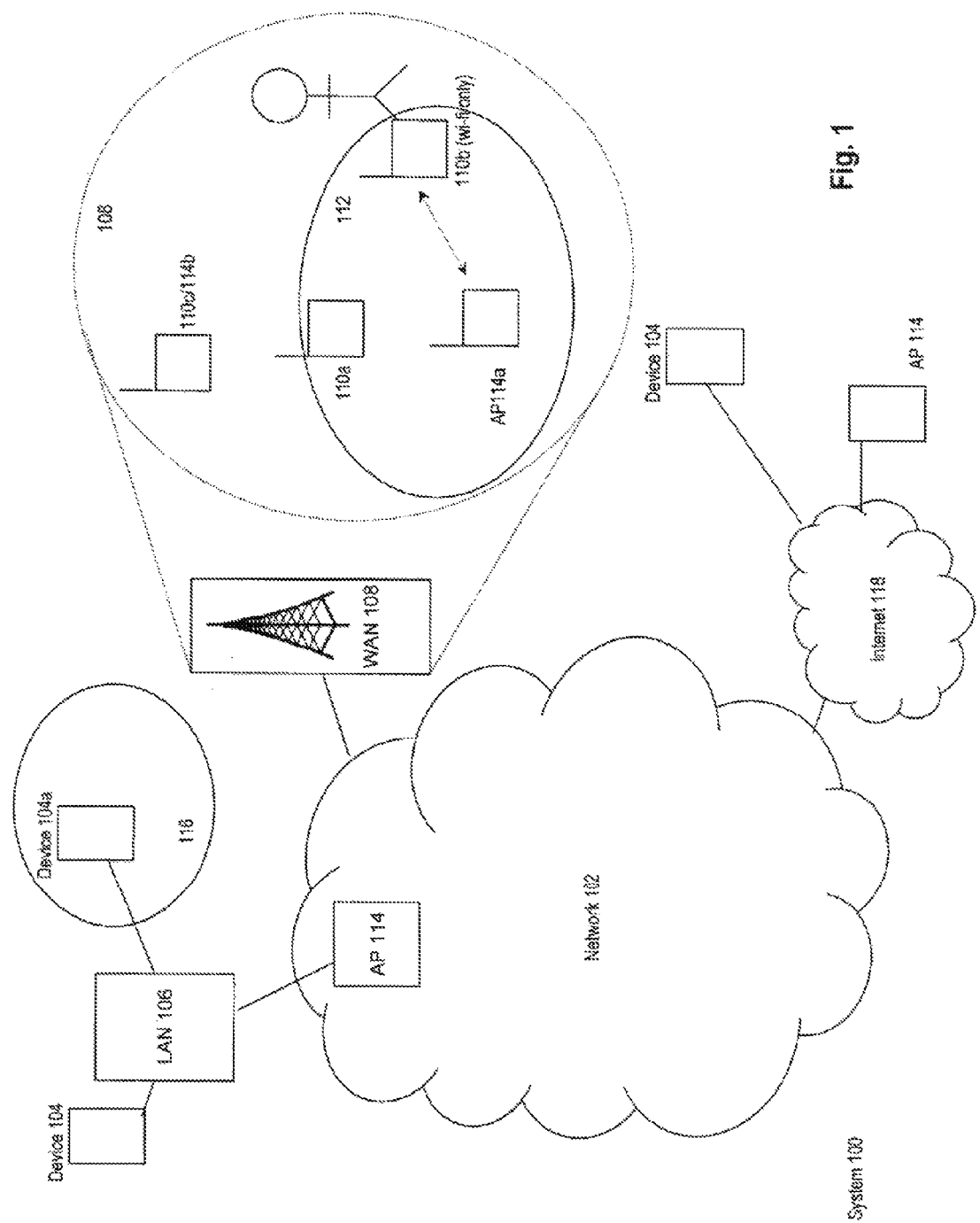
FIG. 1 is a schematic diagram of a wireless communication network having a wireless access point communicating with a wireless electronic communication device according to an embodiment.

Exemplary details of embodiments are provided herein. The description which follows and the embodiments described therein are provided by way of illustration of an example or examples of particular embodiments of principles of the present disclosure. These examples are provided for the purposes of explanation and not limitation of those principles and of the disclosure. In the description which follows, like parts are marked throughout the specification and the drawings with the same respective reference numerals.

Generally, an embodiment provides a system and method for determining and/or ascribing a location for a device in a network. The location data can be used to configure communication parameters for the device.

As a summary of embodiments, in a first aspect, a method of identifying location data for a server device managing communications for a wireless network is provided. The method comprises: obtaining first location data for the server device; identifying a location for the server device by analyzing at least the first location data; updating data in the server device with the location; identifying a communication transmission range for the location for the server device, and configuring communications generated by the server device to conform to the communication transmission range.

In the method, the first location data may be provided in a first transmission received a first client device in the network.

In the method, the network may be an 802.11-class network; and the server device may be a wireless access point device.

In the method, identifying the location for the server device may further comprise analyzing second location data from a second transmission received from a second network.

In the method, the second network may be a Bluetooth network.

In the method, identifying the location for the server device may further comprise filtering the first and the second location data based on at least one of time or signal strength parameters.

In the method, identifying the location for the server device may comprise filtering the first and the second location data based on the signal strength parameters of signals received by the server device from the first and second client devices.

The method may further comprise: extracting second location data from a second transmission received from the network when a trigger condition is detected; identifying the location by analyzing at least the second location data: and updating data in the server device with the location.

In the method, the trigger condition may be a loss of communication between the first client device and the server device.

In the method, the network may be a 802.11-class network; the server device may be an access point for the network; and the first location data may represent a location of the first client device.

In the method, the network may be a 802.11-class network; the server device may be an access point for the network; and the first location data may be provided in a first transmission received the first client device from a second network.

In the method, the communication transmission range may define impermissible transmission frequencies for the server device while associated with the location.

In the method, the communication transmission range may define an open communication transmission band for the location in a television broadcast band for the server device; and the communications generated by the server device may utilize the open communication transmission band.

In a second aspect, a method of identifying location data for a wireless access point device managing communications for an 802.11-class network is provided. The method comprises: extracting first location data from a first transmission received from a client device in the network; identifying a location for the access point by analyzing at least the first location data; updating data in the server device with the location; identifying a communication transmission range for the location for the access point; and configuring communications generated by the access point to conform to the communication transmission range.

In the method, the communication transmission range may define transmission frequencies for use by the access point while associated with the location.

The method may further comprise extracting second location data from a second transmission received from the network. In the method, identifying the location for the access point may further comprise analyzing the first and the second location data.

In a third aspect, a wireless communication device for processing communications from a plurality of wireless devices in a wireless network is provided. The device comprises: a communication module to process communications of a plurality of devices communicating with the wireless device through the wireless network; a location module to determine a location to be associated with the device based on data provided to it; and a communication management module to process communications received from the network, to extract location data received in the communications, to provide the location data to the location module and to configure communications generated by the device according to a communication transmission range associated with the location data.

In the wireless device the network may be an 802.11-class network; and the server device may be a wireless access point device.

In the wireless device, the communication management module may extract the location data from a transmission received from a client device in the network in response to a beacon signal transmitted by the device to the network.

The wireless device may further comprise a graphical user interface (GUI) module to provide location data relating to the device on a display of the device.

In other aspects, various combinations of sets and subsets of the above aspects are provided.

For an embodiment, the network may be wired or wireless. An exemplary wired network has a hub (such as a wired access point) that manages connections for wired and wireless devices. An exemplary wireless network has a wireless transceiver communication with wireless devices. The transceiver generates through its antenna a transmission area for sending and receiving wireless transmissions. The transceiver may act as a hub device for the network such that devices can enter the transmission area and communicate with the transceiver and (attempt to) make connections to the network. In certain configurations for the wireless network, the hub may be a wired device. Communications are generally sent from one device to the transceiver and then the transceiver then sends the communication to the intended second device. Communications with other devices in other networks are channeled through the transceiver, which has connections to other transceivers and other servers in the other networks. In certain networks, some communications may be sent directly between devices in the area.

For example, in a mobile hotspot Wi-Fi network, a mobile gateway can be provided, where the gateway acts as an access point ("AP") to the hotspot. In a hotspot, a given wireless device acts as the gateway to a network. This gateway can allow other devices to connect to that device so that the other devices can obtain Internet access via the mobile network or communicate with each other. One feature of an embodiment provides and/or ascribes location data for the AP. Providing such location data to the AP is useful, as a wireless AP may not have proper location data as it roams around a coverage area for the network.

Having proper, updated location data is useful. The location data can be used to configure transmission characteristics of an AP and to determine whether or not the AP can operate as a hotspot while it is at (or associated with) the current location. For example, at a certain location it can be known that transmissions at certain frequencies, directions, times and/or power levels would not work given particular features at that location (e.g. mountains, tall buildings, open water, airports, etc.). When the AP is provided with the location data, it can configure its transmissions accordingly.

There may also be regulatory issues controlling use of the transmission spectrum by an AP at a given location from governing spectrum management bodies (e.g. the Canadian Radio-television and Telecommunications Commission in Canada and the Federal Communications Commission in the U.S.). Such restrictions can include restricted transmissions around sensitive sites (e.g. military sites, airports, nuclear plant sites, etc.).

Notably, in the U.S. some frequency transmission requirements are described in 47 C.F.R. Section 15.202, which states:

"Client devices that operate in a master/client network may be certified if they have the capability of operating outside permissible part 15 frequency bands, provided they operate on only permissible part 15 frequencies under the control of the master device with which they communicate. Master devices marketed within the United States must be limited to operation on permissible part 15 frequencies. Client devices that can also act as master devices must meet the requirements of a master device. For the purposes of this section, a master device is defined as a device operating in a mode in which it has the capability to transmit without receiving an enabling signal. In this mode it is able to select a channel and initiate network by sending enabling signals to other devices. A network always has at least one device operating in master mode. A client device is defined as a device operating in a mode in which the transmissions of the device are under control of the master. A device in client mode is not able to initiate a network."

Under this Section, which applies to all Section 15 bands (2.4 GHz, 5 GHz and television signal bands), the master device, usually the AP, must initiate transmissions. For example, an AP transmits periodic "beacon" signals to its transmission area to provide an initial signal to all devices that may be interested in communicating with it. Once that beacon signal is received by a device, the device can respond to it.

Under the current European Union (EU) regulations, a client can initiate a probe request even if it has not first received a beacon signal for 2.4 GHz band transmissions. In the 5 GHz transmission band, a client can initiate a probe request in low-power transmissions in the 5.15 GHz-5.25 GHz range. However, in the 5.25 GHz-5.35 GHz and the 5.47 GHz-5.725 GHz bands, an AP may need to first determine if there are any protected RADARs present on a requested channel and maintain control of all of its clients, such that the clients need to be enabled by the AP before they can transmit.

Location data may be useful for determining a regulatory domain for communication transmissions, including any permissible/restricted operating transmit power levels and transmission frequencies. Some regulatory domains have different operating restrictions based on indoor or outdoor transmissions. While compliance with local regulatory requirements by an embodiment is desirable, in certain situations and environments, full compliance with such regulations may not be provided in some instances. Technical functionalities of embodiments provided herein are not diminished if in certain circumstances, some local regulatory requirements are not met.

Also, location data can be used to determine the presence of any used and/or unused transmission bands for other transmissions. For example, for an IEEE 802.11af network, investigations are being made for Wi-Fi transmissions to be carried in so-called television transmission "whitespaces". In this case, operating parameters can use location and need to access a network entity to determine whether there are unused television bands available for communications.

In view of the above issues, an embodiment can use the location data to identify communication transmission restrictions/requirements/characteristics for a given location for an AP. The restrictions may be based on regulatory requirements or other constraints, based on physical restrictions, geographic issues, topological issues, adjacent network issues, etc.

With some restriction issues described, further detail is provided on an exemplary network for an embodiment. In one configuration for the network, the transceiver and the devices have a "server/client" relationship, where the transceiver is the "server" device for the area and the wireless devices are the "clients". In some networks, the server may be a fixed device, such as a wireless router directly connected to a physical wired Ethernet port in a network. The server operates as a node for the network and channels communications from the client devices intended for other devices in the network through the server device, acting as a node. Other networks may have a non-fixed server, such as another wireless device. For the purposes of convenience, and not limitation, the term "fixed" is used herein to describe a device that typically is not mobile, typically has a physical connection to its network (e.g. through an Ethernet port) and typically is powered by a power connection to a utility network (through a power cord). The term "non-fixed" is used herein to describe a device that typically is mobile, typically makes a wireless connection to its network and other devices and typically is powered by a self contained power source (e.g. through a battery). The terms "server/clients" refer generally to devices that are related in some hierarchical network manner. Other terms may be used to describe comparable device relationships for an embodiment, such as "master/slave", "network node/client", "access point/clients", etc.

Features of an embodiment may be more relevant for a non-fixed server, but principles can be applied to a fixed server device. Features of an embodiment can be provided in a remote device, such as another server, that communicates with the servers and clients through the network.

For fixed or non-fixed servers, an embodiment provides two features that can operate either independently or in conjunction with each other. First, an embodiment provides processes for identifying a location data for an access point in a network. Once location data is determined, an embodiment can then configure network parameters and/or transmission characteristics for the AP and its associated devices. Second, an embodiment provides processes to manage and monitor for updates to the location data. If an update is determined to be needed, then the location data are updated. The embodiment can then re-configure the network parameters and/or the transmission characteristics for the AP and its associated devices for the updated location. Each of the two features is discussed in more detail below.

Before discussing more details on the two features, a description is provided on a network having a device, as a server, that provides connections to other devices, as clients, according to an embodiment. Then, detail is provided on an exemplary wireless device related to an embodiment. Then, further detail is provided on connection management features related to controlling how, when and what devices can access the network.

To begin, details are provided on an exemplary network and devices in which an embodiment operates.

Referring to FIG. 1, details on a system of exemplary networks and communication devices according to an embodiment are provided. FIG. 1 shows communication system 100 where network 102 provides access to a suite of applications, services and data to its connected devices 104 through its associated servers. Network 102 can be implemented in any known architecture, providing wired and/or wireless connections to its elements. It will be appreciated that in other embodiments, various networks and subnetworks as described herein may be incorporated into other networks.

In network 102, one or more interface servers (not shown) provide hardware and software systems to allow network 102 to communicate with other networks. As part of a typical network architecture, these networks are typically are organized following a layered model of network functions, such as an OSI model. As is known in the art, the OSI model defines seven layers where each layer controls functions of specific network/connection/applications. Some exemplary networks that are connected and connectable to network 102 are described.

Local area network (LAN) 106 is connected to network 102 and provides local wired and wireless connections to its devices 104 and 104a. Internet 116 may be connected to network 102.

A wireless network provides wireless communication coverage to devices that are located within the wireless transmission area of the WAN. In FIG. 1, one exemplary wireless network is a Wide area Network (WAN) 108. Devices 110 have wireless communication capabilities with one or more wireless networks (described later). WAN 108 may have multiple transmission areas by having multiple communication towers. A WAN network can be provided by a cellular communications company, such as Verizon (trademark).

Network 112 is a Wi-Fi network generally following standards set by the IEEE LAN/MAN Standards Committee, known as IEEE 802, through its working group "11". The 802.11 standard defines media access control (MAC) and physical (PHY) layers in the OSI protocol model for WLAN. The family of 802.11 amendments is sometimes referred to as the 802.11x family. Currently, the 802.11 amendments encompass six wireless modulation techniques that all use the same communication protocol among their communicating elements. Other modulation techniques may be used. Current versions of 802.11 networks include: 802.11a, b, g, n and p, representing PHY amendments to IEEE 802.11. Other protocols are defined in standards covered by 802.11aa/ad/ah/af/ . . . specifications. Specific transmission details and parameters of these networks and channels are known to those of skill in the art.

Wireless devices 110 communicate with each other through the data link layer in network 112. In an exemplary environment, network 112 is a local, geographically small, wireless network. Wireless devices 110 include handheld devices, cell phones and computers (either desktop or portable) having a (wireless) network card, network adapter and/or network interface controller ("NIC") installed therein.

Network 112 includes access point (AP) 114 and supporting radio transmission equipment known to those skilled in the art. In network 112, AP 114a contains an IEEE 802.11 radio receiver/transmitter (or transceiver) and functions as a bridge between network 112 and other networks (such as network 102, LAN 106 and/or network 108) for its carried communications. AP 114a provides data distribution services among devices 110, such as devices 110a and 110b, within network 112 and between devices 110 in network 112 and other devices in other connected networks. AP 114a may be a non-fixed wireless device, and as such AP 114 is effectively another wireless device 110. Functionalities for AP 114 may be provided in devices 110. For example, device 110c may have capabilities to be a Wi-Fi hotspot host and operate as AP 114b. As AP 114 is the data distribution point for network 112, it will be seen that the transmission area is centered on AP 114. As AP 114 moves (as it is a non-fixed device), its transmission area for network 112 will move with it. Other APs may be used as bridges for other networks. It will be seen that an AP is be one form of a server device and that devices 110 are one form of client devices for a network.

For an 802.11 network, a "station" is a basic component in the network. A station is any device that implements the functionality of an 802.11 protocol and has a connection to a wireless local area network. Typically, the 802.11 connection and communication functions are implemented in hardware and software and may be provided in a network connection circuit or system in a NIC at the station. A station may be any device, including a laptop computer, device 104, wireless device 110, or an AP 114. Stations may be mobile, portable, or stationary. All stations support the 802.11 station service of authentication, de-authentication, privacy, and data delivery. For the purposes of an embodiment as it relates to 802.11 standards, devices 110 may be considered to be stations.

A service set (SS) is defined as all devices (or stations) associated with a specific local or enterprise 802.11 wireless LAN(s). A service set identifier ("SSID") is a unique 32-character network name, or identifier, that is created and associated with a particular WLAN 112. A basic service set (BSS) is defined a single access point with all its associated stations. An Extended Service Set (ESS) is a set of one or more basic service sets interconnected through a distribution system (DS) to form a single local area network.

In a Wi-Fi network, communications between AP 114 and device 110 are encoded in standardized "frames" of data. Several classes of frames are defined, including management frames, control frames and data frames. Management frames are used to establish and maintain communications between AP 114 and device 110. Further detail is provided on some types of management frames.

A beacon frame is a management frame that is periodically broadcast by AP 114 (e.g. every 100 ms) to provide a signal of its presence to the communication boundaries of its network. The body of a beacon frame contains: a beacon interval, providing the amount of time between beacon transmissions; a timestamp, which may be used by a station to synchronize itself and update its local clock; and the SSID of the network 112 of the AP 114. The beacon frame can also provide: data indicating the supported transmission rates of network 112; data regarding the signaling parameters of network 112, such as frequency hopping spread spectrum, direct sequence spread spectrum, etc.; data on the capabilities of network 112; and data providing a traffic indication map (TIM). The beacon frame can contain regulatory operating information such as a list of permissible channels and bands as well as transmit power levels. The beacon frame includes a frame header and cyclic redundancy checking (CRC) field. The destination address of the frame is set to all 1's, which is the broadcast MAC address. This will cause all other stations on the applicable channel to process a received beacon frame. Other embodiments may selectively broadcast a beacon or may vary the broadcast transmission parameters upon satisfaction of preset conditions.

Devices 110 and their NICs may continually scan some or all 802.11 radio channels and listen for beacons. There may be a filter to listen or not listen for specific beacons. If multiple beacons are received from multiple APs, then device 110 may evaluate the parameters of the underlying networks to identify a most suitable network. Thereafter, the device would then attempt to establish communications to that network through the selected AP.

Before a device 110 can be associated with network 112, it may need to obtain the SSID of AP 114a. Generally, a network identification scanning functions (such as those functions provided by Windows XP, trade-mark) is provided on device 110 to allow the device to process the network information in a received beacon signal. Such functions can extract the SSID data to configure device 110 and its associated NIC with the proper SSID for that WLAN.

Authentication frames are another type of management frame and they are used to initiate a connection request between device 110 and AP 114. In Wi-Fi protocols, authentication is a process where AP 114 either accepts or rejects the identity of device 110. Device 110 begins authentication by generating and sending an authentication frame containing its identity to AP 114. In one embodiment authentication would be initiated only after the device 110 has received a beacon signal from AP 114. In one configuration, device 110 always needs to scan to discover network 112, prior to authenticating to network 112. Scanning can be active or passive. In active scan, probe frames are used, which are another class of frames. Active scanning is done by device 110 sending a probe request frame to AP 114 and receiving a probe response frame. Other messaging protocols may be used outside of the Wi-Fi standard protocols. In other embodiments, authentication may be initiated by device 110 before a beacon signal is received by it. Timing of when and how device 110 communicates with AP 114 may be regulated by local governing bodies for a particular jurisdiction. AP 114 is expected to respond with an authentication frame indicating acceptance (or rejection) of the authentication frame.

Additional data, such as shared key authentication data can be exchanged between device 110 and AP 114 in subsequent authentication frames. Therein, device 110 would first send an initial authentication frame containing challenge text. Device 110 is then expected to send an encrypted version of the challenge text (using its key) in an authentication frame to AP 114. AP 114 would evaluate whether device 110 has the correct key by determining whether or not the challenge text recovered after decryption is the same that was sent previously. From this analysis, AP 114 provides a response to device 110 with an authentication frame signifying the result of authentication.

Association frames are another type of management frames. Association allows AP 114 to allocate resources for and synchronize with device 110. Following an authentication request, device 110 initiates an association process by sending an association request to AP 114. AP 114 would process the request and send an association response frame containing an acceptance or rejection notice to device 110. If AP 114 accepts device 110, device 110 can connect to network 112 through AP 114. As such AP 114 will either accept or deny access to network 112 for device 110 depending on whether or not "new" devices are to be accepted into network 112.

Other frames in other classes may also be used to transmit status and data between entities. Other messaging protocols may be used outside of the Wi-Fi standard protocols.

Figure 2:
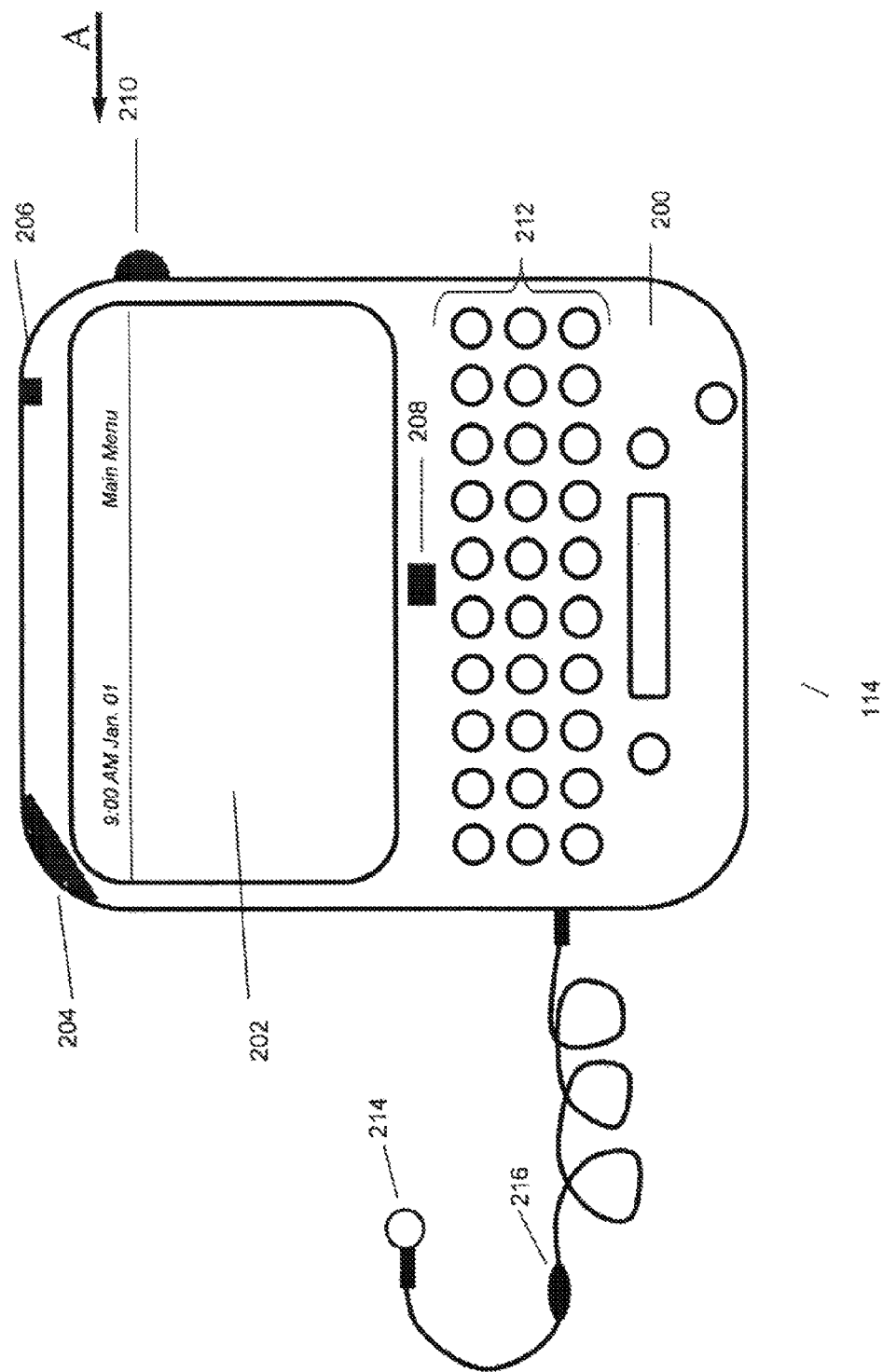
FIG. 2 is a schematic representation of the wireless access point device of FIG. 1 implementing location determination and algorithms according to an embodiment.

With some network features identified, further detail is provided on AP 114 in network 112. FIG. 2 provides general features of AP 114 (and/or device 110) in accordance with an embodiment of the disclosure. In the present embodiment, AP 114/device 110 is based on a computing platform having functionality of an enhanced personal digital assistant with cellphone and e-mail features. It is, however, to be understood that AP 114/device 110 can be based on construction design and functionality of other electronic devices, such as smart telephones, desktop computers, tablet devices, pagers or laptops having telephony equipment. In a present embodiment, AP 114 includes a housing 200, a display 202 (which may be a liquid crystal display—LCD), speaker 204, an LED indicator 206, an input device 208 (which may be a trackpad, trackball, thumbwheel or other input device), an ESC ("escape") key 210, keypad 212, a telephone headset comprised of an ear bud 214 and a microphone 216. ESC key 210 can be inwardly depressed along the path of arrow "A" as a means to provide additional input to AP 114/device 110.

It will be understood that housing 200 can be made from any suitable material as will occur to those of skill in the art and may be suitably formed to house and hold all components of AP 114/device 110.

AP 114 / device 110 is operable to conduct wireless telephone calls, using any wireless phone system, such as for example a Global System for Mobile Communications (GSM) system, Code Division Multiple Access (CDMA) system, wireless CDMA, CDMA 2000 system, Cellular Digital Packet Data (CDPD) system and Time Division Multiple Access (TDMA) system. Other wireless phone systems can include Wireless WAN (IMS), Wireless MAN (Wi-max or IEEE 802.16), Wireless LAN (IEEE 802.lx), Wireless PAN (IEEE 802.15and Bluetooth), high-speed data packet access (HSDPA) networks, etc. and any others that support voice. Additionally, a Bluetooth network may be supported. Other embodiments include Voice over IP (V0IP) type streaming data communications that can simulate circuit-switched phone calls. Ear bud 214 can be used to listen to phone calls and other sound messages and microphone 216 can be used to speak into and input sound messages to AP 114 / device 110.

AP 114/device 110 is a processor-controlled device (not shown). Software applications operating on AP 114/device 110 control its operations and network connections to implement the three features. Further detail on selected applications for an embodiment is provided later.

AP 114 may operate as a dual-mode modem. Its mobile data communication functions allow it to make WAN connections and allow it to deliver voice and e-mails to user of AP 114. Its Wi-Fi connections (acting as a server) enable delivery of data to other devices 110 (e.g. a remote wireless device) simultaneously. Since wireless AP 114 is portable, it may move. As such, its wireless coverage for network 112 and devices 110 are dynamic, each independently potentially ranging from non-existent, to poor, to adequate, to good and to excellent (with values in-between). As such, overall throughput between wireless AP 114 and device 110 can depend on an instantaneous wireless signal quality of two PHY layers, namely a Physical Coding Sublayer (PCS) and a Physical Medium Dependent (PMD) layer. The PCS encodes and decodes the data that is transmitted and received.

Figure 3A:
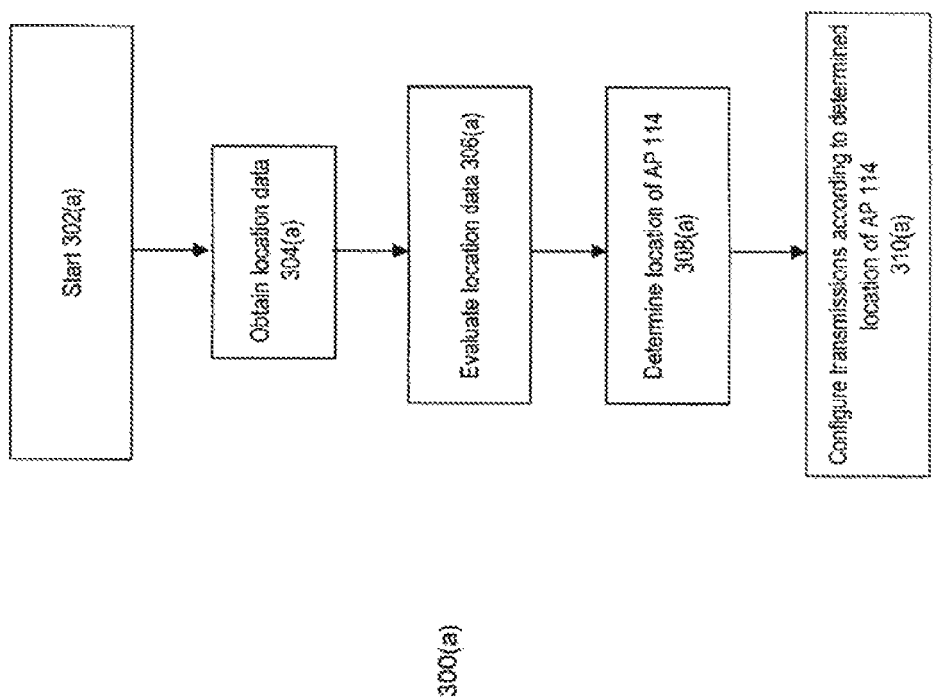
FIG. 3A is a flowchart of exemplary processes executed by a first algorithm in the access point of FIG. 2 in determining a location data for the access point according to an embodiment.

With some functions of AP 114 described, further detail is provided on communication management processes conducted by AP 114. Referring to FIG. 3A, process 300(a) shows an exemplary location identification algorithm operating on AP 114 (or operating on a remote device that provides information to it).

Flow chart 300(a) is initiated with start process 302(a), which may be initiated automatically after a defined event. Some other event triggers may include powering-up of AP 114, resetting of communication parameters of AP 114, passage of a set amount of time since a last location update, detection that AP 114 has entered a new network transmission area, and scheduled location checks by device 110 either at periodic intervals, episodically and/or after a triggering event. From start process 302(a), chart 300(a) moves to process 304(a), where AP 114 obtains/requests data for its current location data. The location data may be obtained from an internal process on AP 114. For an internal process, AP 114 may determine its current location data from accessing GPS data, which may be provided from an internal GPS device (for example GPS module 436, FIG. 4) or from previous location data stored in AP 114.

Additionally or alternatively, as part of process 304(a), if AP 114 is to determine its location data from an external source, AP 114 initiates an external request to provide its current location data. The request may be submitted to network 112. For example, AP 114 may send a request for its location data to network 112 and a response may be provided to it from a server or a device in the network. The device may be a device different from device 110, e.g. it may be a server that provides location data to its requesting entities. Location data may be determined from GPS data and/or other data (e.g. address information).

For network 112, if AP 114 was seeking location information in an environment where there were one, two or more devices 110 in its communication range, then AP 114 may use other algorithms to seek location data. Therein, a relationship between AP 114 and a location station (e.g. device 110 having a designated location data) is sought, or at least a handshake between the two. In pairing the two, on setup, the location station may be configured to allow it to provide location data to AP 114. This provisioning can be provided through a different network (e.g. a Bluetooth transmission). In another feature AP 114 may be provided with location data from device 110 through information provided over the same network. For example, in an access network query protocol (ANQP), AP 114 may be provided with location data for device 110 through data encoded in a reply from device 110 to AP 114 from an ANQP query that is querying for location information by AP 114. Additionally, in certain contexts, device 110 may have additional location information. For example under a wireless access in vehicular environments (WAVE) protocol per IEEE 802.11p standards, device 110 may be imputed with certain local status data (e.g. device 110 is in or not in a vehicle) and/or other location data (e.g. geographic location of the vehicle and/or device 110).

Alternatively, AP 114 may send information over the WLAN to discover a station with "location" capabilities; for this situation, AP 114 may first need to acquire its operating parameters before attempting to discover any stations per a local regulatory regime. Complete operating parameters may include location information. This situation may be addressed by ignoring the restriction, using "primer" data as a placeholder for incomplete information and/or obtaining location data through alternative channels before a transmission is made to the network through an external source described herein.

If location data for AP 114 is incomplete, the primer data may include location data that is currently accessible to the device (e.g. either internally or through another network). Internal local data may include a default location, an original location used when AP 114 was first activated/configured, location data used when AP 114 was last activated for that network or the last known location of AP 114. The primer location data provide an approximate location of AP 114 (e.g. in a postal code, in a city, in a province/state, in a time zone, in a country, in a continent, etc.). AP 114 may subsequently update its location data through additional information provided through an external source and/or network 112.

As part of the request for location data from an external source, AP 114 can attempt to obtain its location data from device 110 in network 112. Location data from a given device 110 may be provided as part of an authentication routine for device 110 when it is communicating with AP 114. For example, when device 110 initially enters the coverage area for AP 114, device 110 generally waits for an expected Wi-Fi beacon signal from AP 114. Once the beacon signal is received, device 110 may generate and send an authentication frame containing its identity to AP 114. In one network configuration, AP 114 can only transmit a beacon signal when it is operational. However, if AP 114 is to operate, in one embodiment, it needs to know the local regulatory information. A station (e.g. device 110) may transmit location information to the AP 114 in and out of band transmission (e.g. over a different network, such as a Bluetooth network). Alternatively and/or additionally, AP 114 may determine an operating channel and power level that is a predetermined default (e.g. that may be accepted worldwide) and then AP 114 may include an element in a beacon signal to advertise that it requires location information. When the station receives the beacon signal, the station can respond with a management frame containing regulatory information. Thereafter AP 114 can set its regulatory information and begin operation.

Alternatively and/or additionally, there is a location element defined in IEEE 802.11 which could be used to determine the location, such as a location information request element. AP 114 may use either a beacon or a measurement pilot frame containing either a capability field indicating that the location is not known and/or an information element indicating that the location is not known.

A station in network 112 (e.g. device 110) may provide a transmission to AP 114 where location information in carried in one or more of transmission elements: a location information response element; a probe request; a probe response; or an authentication frame containing location information. The authentication frame may include and/or be followed by data relating to the location of device 110. The location data may be used on GPS data internally generated by device 110, stored data relating to its location, location data determined from an analysis of its transmissions with its cellular towers and/or other location data.

Location data derived from GPS data is generally considered to be more precise than location data derived from cellular tower data. Location data can have different levels of granularity. For example, the location data can provide one or more of country/province/region/territory/city/postal code and/or street information. Location data may be derived from other data, such as an analysis of strengths of transmission signals received/sent by device 110, data regarding known available networks to device 110, sensor data where device 110 starts from a known location and then internally tracks its movement and updates its location and other data. Device 110 may determine a location from measuring signals from towers using triangulation and/or other timing of arrival of data from a transmitter.

Next, at process 306(*a*), once location data is obtained, AP 114 identifies its location using any of the location data provided from the internal process and/or data provided from an external source. It is possible that AP 114 receives multiple location data points. In such a situation, AP 114 may synthesize and analyze all the location data received to identify a deemed location. For example, AP 114 may receive multiple location data from multiple devices 110 as they respond to beacon signals. The total set of location data may be filtered. Filters can also be provided to include/exclude data received in a defined period of time and/or since a defined event. Data from any internal processes may be collected and filtered on comparable bases.

From a resulting group of location data, a further evaluation may be conducted to identify a deemed location for AP 114. The further evaluation may be based on time/event filtering parameters and/or other parameters, including a weighting parameter to identify the most frequently cited location(s) and/or an evaluation of a reliability of the data provided by sending device 110. One filter is to discard location data attributed from devices 110 that have communication signals to AP 114 that are below a determined threshold. A low strength communication signal from a first device 110 may indicate that the first device 110 is far away from AP 114. As such, location data for that device 110 may be deemed to not be reliable and/or relevant for the location of AP 114. Conversely, a high strength communication signal from a second device 110 may indicate that the second device 110 is near to AP 114. As such, location data for the second device 110 may be deemed to be reliable and/or relevant for the location of AP 114, as a higher confidence can be afforded to the location data from the second device 110 as being relevant to AP 114.

Next, at process 308(*a*), once a location is identified by AP 114, it may identify radio frequency transmission requirements for the determined location. The requirements may define certain transmission frequency range(s) that are permissible for use, must be used and/or are impermissible for use. As noted above, certain geographic locations may require and/or restrict frequency communications and/or impose certain communication protocols for AP 114. For example, for a given country code (e.g. EU countries), there may be restrictions on using certain bands in the frequency spectrum (e.g. those that interfere with RADAR spectrums). As such, when the determined location is deemed to be in an EU country, transmissions from AP may be limited to such frequency bands. As another example, for a given country code, restrictions can be provided to limit network scans to certain channels. This would have the effect of avoiding non-necessary channel scans, thereby saving transmission and power resources of AP 114. Another mechanism would issue a query to a network resource to determine whether it can operate on a particular frequency. This can be used when searching for whitespace television transmission bands (or other transmission bands) in searching for unused television broadcast bands. The aim is to identify an open communication transmission band for the location in a television broadcast band for AP 114 and then to configuring communications generated by AP 114 to utilize an open communication transmission band. The query could be done through a paired device with cellular capability. A database accessed by AP 114 can be provided containing a list of geographic location and relevant transmission ranges for each location.

Next, at process 310(*a*), once radio frequency transmission requirements are identified for the determined location, AP 114 can format its transmissions and/or communication protocols to conform to at least some of such requirements. Once the transmission parameters are set, AP 114 functions as a typical AP, with its known location data.

A graphical user interface (GUI) may be provided on AP 114 that displays updated location data on its display and details on how the location was determined. The GUI may also provide details on the communication configurations made in view of the determined location.

Referring to FIG. 3B, it will be appreciated that AP 114, as a wireless device, is mobile and can move. As such, it is possible that the current location data for AP 114 becomes outdated as it moves or after passage of a certain amount of time. For example, AP 114 may be situated in a car when its location is determined per flow chart 300(*a*). When AP 114 identifies a first location, it is associated with that first location and can configure its transmissions according to any restriction associated with that location. However, as the car travels, its actual location AP 114 changes, while its associated location remains as previously set. Also, devices 110 that are communicating with AP 114 may change. As such, to address this situation, a further process is provided for AP 114 to periodically and/or occasionally update the location data associated with it.

In FIG. 3B, further detail is provided on monitoring for changing/updating location data associated with AP 114 in flow chart 300(*b*). It will be seen that flow chart 300(*b*) shares some processes with flow chart 300(*a*).

Flow chart 300(*b*) initiates with start/monitor process 302(*b*). The monitor process may be initiated automatically completion of flow chart 300(*a*) (FIG. 3A). The monitoring may be initiated after detection of a triggering event. The triggering event may be one or more defined events (e.g. powering on of AP 114, resetting of its communication parameters, passage of a set amount of time since a last location update, detection of connection change for one or more of its devices 110, etc.).

An embodiment also provides intermediary changes to its transmissions and/or communication protocols when triggering events are detected by AP 114. The events can relate to a change in status of AP 114 and/or a change in status of an element in network 112, e.g. device 110. For example, if loss of a connection to a particular device 110 is detected, AP 114 may consider this to be a triggering event. That particular device 110 may be the original device that provided AP 114 with its location data. Loss of a connection to that particular device 110 may indicate a change in a location for AP 114. When such a loss of a connection is detected, AP 114 may initiate processes to change its operating parameters for its network 112. For example, AP 114 may change a cadence of its transmission of probe/beacon signals. The cadence may be increased or decreased from its current value. By increasing the cadence, AP 114 is attempting to re-connect with the "lost" device 110 sooner. Alternatively, upon loss of a specific connection signal, AP 114 may deem that its location data is no longer valid and cannot be trusted. As such, it may initiate a tear down command for all connections in its network 112. In order to re-establish location data, AP 114 can then send a new beacon signal to establish a new network of connections and to obtain new location data from devices 110. Other changes can be provided when there is a gain of a new device 110. Monitoring for these intermediary triggering events can be provided in process 302(*b*) and/or can be provided in a background process that operates on AP 114.

Once the monitoring process 302(*b*) has determined that a triggering event has occurred and that revised location data for AP 114 is needed, processes 304(*b*), 306(*b*), 308(*b*) and 310(*b*) follow comparable processes as recited earlier for processes 304(*a*), 306(*a*), 308(*a*) and 310(*a*).

With aspects of the two features of an embodiment described, further detail is now provided on internal components in AP 114.

Figure 4:
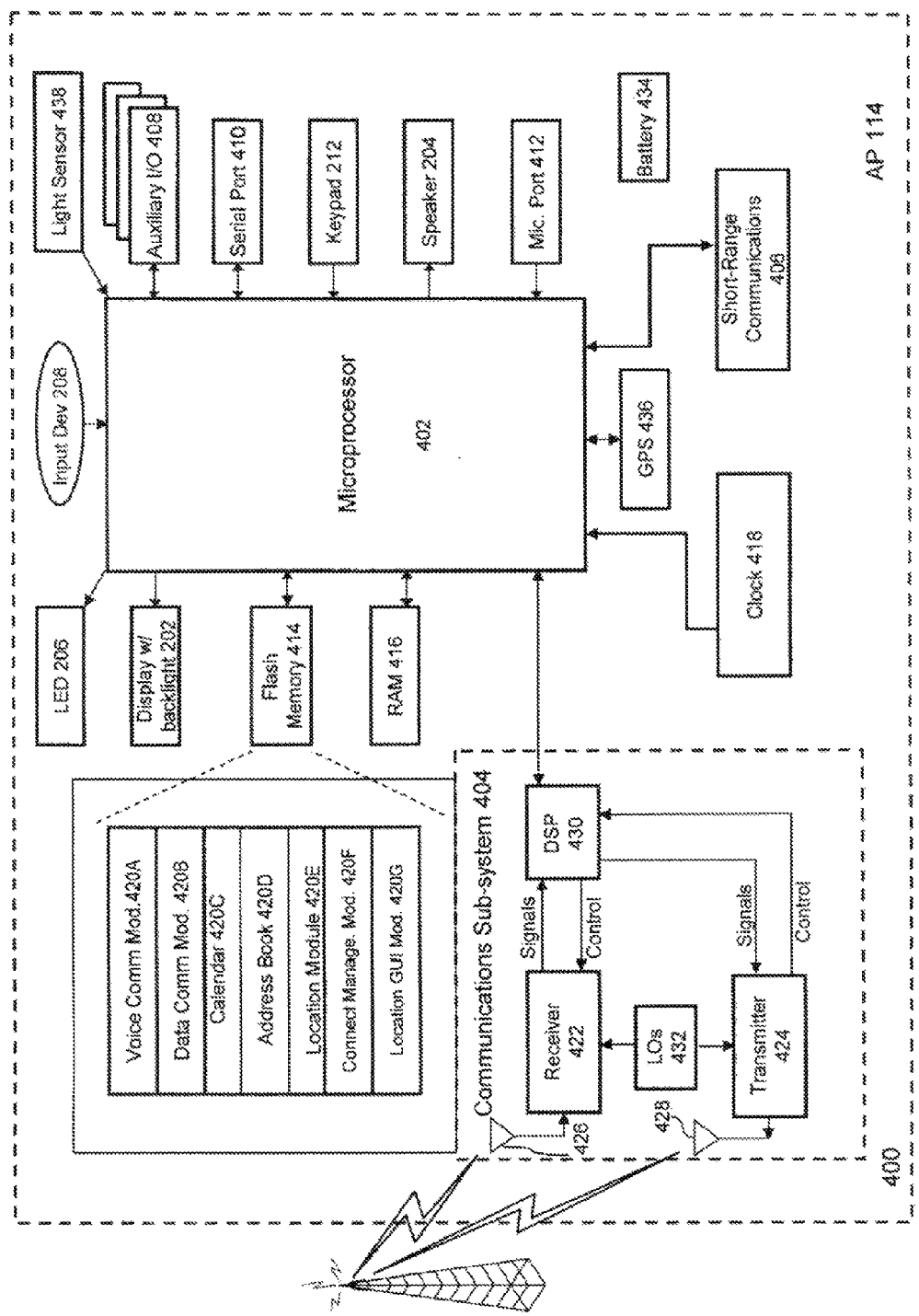
FIG. 4 is a block diagram of certain internal components of the access point of FIG. 2.

Referring to FIG. 4, functional components of AP 114/device 110 are provided in schematic 400. The functional components are generally electronic, structural or electromechanical devices. In particular, processor 402 is provided to control and receive almost all data, transmissions, inputs and outputs related to AP 114/device 110. Processor 402 is shown schematically as coupled to keypad 212 and other internal devices. Processor 402 preferably controls the overall operation of AP 114/device 110 and its components. Exemplary processors for processor 402 include microprocessors in the Data 950 (trade-mark) series, the 6200 series and the PXA900 series, all available at one time from Intel Corporation. Processor 402 is connected to other elements in AP 114/device 110 through a series of electrical connections to its various input and output pins. Processor 402 has an IRQ input line which allows it to receive signals from various devices and modules. Appropriate interrupt firmware is provided which receives and reacts to the signal detected on the IRQ line. An interrupt signal may be used to indicate a request to terminate the segmented scanning mode of an embodiment.

In addition to processor 402, other internal devices of AP 114/device 110 are shown schematically in FIG. 4. These include: display 202; speaker 204; keypad 212; communication sub-system 404; short-range communication sub-system 406; auxiliary I/O devices 408; serial port 410; microphone port 412 for microphone 216; flash memory 414 (which provides persistent storage of data); random access memory (RAM) 416; clock 418 and other device sub-systems (not shown). AP 114 is preferably a two-way radio frequency (RF) communication device having voice and data communication capabilities. In addition, AP 114 preferably has the capability to communicate with other computer systems via the Internet.

Operating system software executed by processor 402 is preferably stored in a computer-readable medium, such as flash memory 414, but may be stored in other types of memory devices, such as read-only memory (ROM) or similar storage element. In addition, system software, specific device applications, or parts thereof, may be temporarily loaded into a volatile store, such as RAM 416. Communication signals received by the mobile device may also be stored to RAM 416.

In addition to an operating system operating on AP 114/device 110, additional software modules 420 enable execution of software applications on AP 114/device 110. A set of software (or firmware) applications, generally identified as applications 420, that control basic device operations, such as voice communication module 420A and data communication module 420B, may be installed on AP 114/device 110 during manufacture or downloaded thereafter. As well, other software modules are provided, such as calendar module 420C and address book 420D.

Location module 420E receives location data from internal processes and external sources noted above. Internal processes provided data from GPS 436. External sources include data provided from devices 114 and other devices in network 112. Ranking and location identification algorithm as described in exemplary processes 306(a) and 306(b) may be performed by location module 420E. Once location data is determined, the information is provided to communication management module (CMM) 420F for further processing. Location module 420E may also monitor for events (or monitor for events with other modules 420) that satisfy triggering condition(s), which would then force AP 114 to restart its location data analysis.

Messages received and/or generated by any module 420 may be processed by data communications module 420B. Messages may be transmitted/received in network layer communications, emails, and/or other messaging systems to network 112 and/or devices 110. Module 420B receives messages from external devices 110, extracts relevant information from them and provides the information to relevant modules such as CMM 420F. Module 420B notifications from modules 420 (such as CMM 420F and location module 420E), extracts relevant information from them and generates and sends messages containing relevant information to the messages to network 112, including to devices 110. Messages relating to network 112 for device 110, when operating as an AP are processed separately by the modules from other non-network 112 communications (e.g. cellular communications) processed by device 110.

CMM 420F is software and/or firmware that controls how and when communications are packaged and transmitted following a communication protocol. The selected communication protocol is based on the location data for AP 114 as provided in flow charts 300(a) and 300(b) (FIGS. 3A and 3B). Communications and data are streamed through either communication modules 404 or 406. CMM 420F may also receive signals from other modules providing information to it on other modules that are using communication modules 404 or 406.

Location GUI module (LGM) 420G is software and/or firmware that provides GUIs in generating display screens on display 202 of AP 114 providing location and network information as noted earlier.

Additional modules such as personal information manager (PIM) application may be provided. Any module may be installed during manufacture or downloaded thereafter into AP 114/device 110.

Data associated with each application, the status of one or more networks, profiles for networks and trigger conditions for commands for networks can be stored and updated in flash memory 414.

Communication functions, including data and voice communications, are performed through the communication sub-system 404 and the short-range communication sub-system 406. Collectively, sub-systems 404 and 406 provide the signal-level interface for all communication technologies processed by AP 114. Various applications 420 provide the operational controls to further process and log the communications. Communication sub-system 404 includes receiver 422, transmitter 424 and one or more antennas, illustrated as receive antenna 426 and transmit antenna 428. In addition, communication sub-system 404 also includes processing modules, such as digital signal processor (DSP) 430 and local oscillators (LOs) 432. The specific design and implementation of communication sub-system 404 is dependent upon the communication network in which AP 114/device 110 is intended to operate. For example, communication sub-system 404 of AP 114/device 110 may operate with the Mobitex (trade-mark), DataTAC (trade-mark) or General Packet Radio Service (GPRS) mobile data communication networks and also operate with any of a variety of voice communication networks, such as 802.11 networks, Bluetooth networks. Advanced Mobile Phone Service (AMPS), Time Division Multiple Access (TDMA), Code Division Multiple Access (CDMA), CDMA 2000, Personal Communication Service (PCS), Global System for Mobile Communication (GSM), WWAN (cellular), WMAN (Wi-max), WLAN (Wi-Fi), and WPAN (Bluetooth) in other disclosures, etc. Other types of data and voice (telephonic) networks, both separate and integrated, may also be utilized with AP 114/device 110. In any event, communication sub-system 404 provides AP 114/device 110 with the capability of communicating with other devices using various communication technologies, including instant messaging (IM) systems, text messaging (TM) systems and short message service (SMS) systems.

Short-range communication sub-system 406 enables communication between device 110 and other proximate systems or devices, which need not necessarily be similar devices. For example, the short-range communication sub-system may include an infrared device and associated circuits and components, a Wi-Fi or a Bluetooth (trade-mark) communication module to provide for communication with similarly enabled systems and devices. Sub-system 406 may have one or more inputs or outputs to sub-system 404 in processing signals for its networks.

In addition to processing communication signals, DSP 430 provides control of receiver 426 and transmitter 424. For example, gains applied to communication signals in receiver 426 and transmitter 424 may be adaptively controlled through automatic gain-control algorithms implemented in DSP 430. One particular operational aspect of receiver 422 and antenna 426 is that they may need to be tuned to receive signals in the 802.11 network bands, e.g. signals in the 2.4 GHz to 5.8 GHz range for sub-systems 406 and if needed, sub-system 404. Additional filters on antennas may also be used to provide such functionality.

Receiver 422 and antenna 426 provide at least some of the hardware and software elements needed to detect when AP 114/device 110 is in the presence of communication signals from networks 108 and 110, thereby enabling AP 114/device 110 to communicate with other devices in networks 108 and 112.

Powering the entire electronics of the mobile handheld communication device is power source 434. In one embodiment, the power source 434 includes one or more batteries. In another embodiment, the power source 434 is a single battery pack, especially a rechargeable battery pack. A power switch (not shown) provides an "on/off" switch for AP 114/device 110. A power source interface (not shown) may be provided in hardware, firmware, software or a combination of such elements to selectively control access of components in AP 114/device 110 to power source 434. Upon activation of the power switch an application 420 is initiated to turn on AP 114/device 110. Upon deactivation of the power switch, an application 420 is initiated to turn off AP 114/device 110. Power to AP 114/device 110 may also be controlled by other devices and by software applications 420.

AP 114/device 110 may also have global positioning system 436 to assist in identifying a present location of AP 114 and may also have light sensor 438 to provide data on the ambient light conditions for AP 114.

Although an embodiment has been described in terms of identifying/maintaining server/client device hierarchies in a wireless network, such as an 802.11 network, the features of an embodiment can be provided in coordinate aspects of different connections among different devices in different networks.

It will be appreciated that location module 420E, CMM 420F, LGM 420G and other modules in the embodiments can be implemented using known programming techniques, languages and algorithms. Although the modules described are implemented in AP 114, it will be appreciated that some functions of the modules may be provided in a separate server that is in communication with AP 114 and/or devices 110. Titles of the modules are provided as a convenience to provide labels and assign functions to certain modules. It is not required that each module perform only its functions as described above. As such, specific functionalities for each application may be moved between applications or separated into different applications. Modules may be contained within other modules. Different signaling techniques may be used to communicate information between applications using known programming techniques. Known data storage, access and update algorithms allow data to be shared between applications. It will further be appreciated that other applications and systems on device 110 may be executing concurrently with other modules. As such, any of modules 420 (or parts thereof) may be structured to operate in as a "background" application on AP 114, using programming techniques known in the art.

It will be appreciated that the embodiments relating to client devices, server devices and systems may be implemented in a combination of electronic hardware, firmware and software. The firmware and software may be implemented as a series of processes, applications and/or modules that provide the functionalities described herein. The algorithms and processes described herein may be executed in different order(s). Interrupt routines may be used. Data may be stored in volatile and non-volatile devices described herein and may be updated by the hardware, firmware and/or software.

As used herein, the wording "and/or" is intended to represent an inclusive-or. That is, "X and/or Y" is intended to mean X or Y or both.

In this disclosure, where a threshold or measured value is provided as an approximate value (for example, when the threshold is qualified with the word "about"), a range of values will be understood to be valid for that value. For example, for a threshold stated as an approximate value, a range of about 25% larger and 25% smaller than the stated value may be used. Thresholds, values, measurements and dimensions of features are illustrative of embodiments and are not limiting unless noted. Further, as an example, a "sufficient" match with a given threshold may be a value that is within the provided threshold, having regard to the approximate value applicable to the threshold and the understood range of values (over and under) that may be applied for that threshold.

The present disclosure is defined by the claims appended hereto, with the foregoing description being merely illustrative of embodiments of the disclosure. Those of ordinary skill may envisage certain modifications to the foregoing embodiments which, although not explicitly discussed herein, do not depart from the scope of the disclosure, as defined by the appended claims.

The invention claimed is:

1. A method of identifying location data for an access point in order to initiate communications for a wireless network, the method comprising:
   retrieving, at the access point, an initial location of the access point, the initial location of the access point comprising one of initial geo-location based location data or an initial country code, the initial location obtained from adjacent fixed access points; and, after both retrieving the initial location data, and when a triggering event occurs, the triggering event comprising one or more of a passage of a set amount of time, or detection that the access point has been located to a new network transmission area:
   retrieving updated location data comprising an updated location of the access point, the updated location of the access point comprising one of updated geo-location based location data or an updated country code, the updated location obtained from further adjacent fixed access points, the updated location data comprising incomplete location information;
   receiving additional location data from a transmission received from the wireless network, the additional location data being more geographically precise than the updated location data and supplementing the incomplete location information;
   updating the updated location using the additional location data; and, when the updated location data is different from the initial location data:
      identifying a communication transmission range that conforms with regulations of a spectrum management body administrating transmissions for the updated location of the access point; and,
      configuring communications generated by the access point to utilize the communication transmission range and to conform to the regulations.

2. The method of claim 1, further comprising:
   initiating the wireless network by sending, from the access point to communication devices of the wireless network, a beacon signal to initiate communications with the communication devices of the wireless network, the access point acting as the master of the wireless network, the communication devices comprising portable communication devices.

3. The method of claim 1, wherein:
   the regulations define impermissible transmission frequencies for the access point for the updated location.

4. The method of claim 1, wherein:
   the regulations define an open communication transmission band for the updated location in a television broadcast band for the access point; and
   the communications generated by the access point utilize the open communication transmission band.

5. The method of claim 1, wherein:
   the wireless network comprises an 802.11 wireless network.

6. The method of claim 1, wherein: the transmission is received from one or more communication devices in the wireless network.

7. An access point for processing communications from a plurality of communication devices to establish a wireless network, the access point comprising:
   a processor and a memory device, the processor configured to:
      retrieve an initial location of the access point, the initial location of the access point comprising one of initial geo-location based location data or an initial country code, the initial location obtained from adjacent fixed access points; and, after both retrieving the initial location data, and when a triggering event occurs, the triggering event comprising one or more of a passage of a set amount of time, or detection that the access point has been located to a new network transmission area:
  retrieve updated location data comprising an updated location of the access point, the updated location of the access point comprising one of updated geo-location based location data or an updated country code, the updated location obtained from further adjacent fixed access points, the updated location data comprising incomplete location information;
  receive additional location data from a transmission received from the wireless network, the additional location data being more geographically precise than the updated location data and supplementing the incomplete location information;
  update the updated location using the additional location data; and,
  when the updated location data is different from the initial location data:
    identify a communication transmission range that conforms with regulations of a spectrum management body administrating transmissions for the updated location of the access point; and,
    configure communications generated by the access point to utilize the communication transmission range and to conform to the regulations.

8. The access point of claim 7, wherein the processor is further configured to:
  initiate the wireless network by sending, from the access point to communication devices of the wireless network, a beacon signal to initiate communications with the communication devices of the wireless network, the access point acting as the master of the wireless network, the communication devices comprising portable communication devices.

9. The access point of claim 7, wherein:
  the regulations define impermissible transmission frequencies for the access point for the updated location.

10. The access point of claim 7, wherein:
  the regulations define an open communication transmission band for the updated location in a television broadcast band for the access point; and the communications generated by the access point utilize the open communication transmission band.

11. The access point of claim 7, wherein:
  the wireless network comprises an 802.11 wireless network.

12. The access point of claim 7, wherein: the transmission is received from one or more communication devices in the wireless network.

13. A non-transitory computer-readable medium storing a computer program, wherein execution of the computer program is for identifying location data for an access point in order to initiate communications for a wireless network by:
  retrieving, at the access point, an initial location of the access point, the initial location of the access point comprising one of initial geo-location based location data or an initial country code, the initial location obtained from adjacent fixed access points; and, after both retrieving the initial location data, and when a triggering event occurs, the triggering event comprising one or more of a passage of a set amount of time, or detection that the access point has been located to a new network transmission area:
    retrieving updated location data comprising an updated location of the access point, the updated location of the access point comprising one of updated geo-location based location data or an updated country code, the updated location obtained from further adjacent fixed access points, the updated location data comprising incomplete location information;
    receiving additional location data from a transmission received from the wireless network, the additional location data being more geographically precise than the updated location data and supplementing the incomplete location information;
    updating the updated location using the additional location data; and,
    when the updated location data is different from the initial location data:
      identifying a communication transmission range that conforms with regulations of a spectrum management body administrating transmissions for the updated location of the access point;
      configuring communications generated by the access point to utilize the communication transmission range and to conform to the regulations.

* * * * *